No. 846,088. PATENTED MAR. 5, 1907.
C. E. BRINLEY.
SHAFT COLLAR.
APPLICATION FILED APR. 6, 1906.
2 SHEETS—SHEET 1.
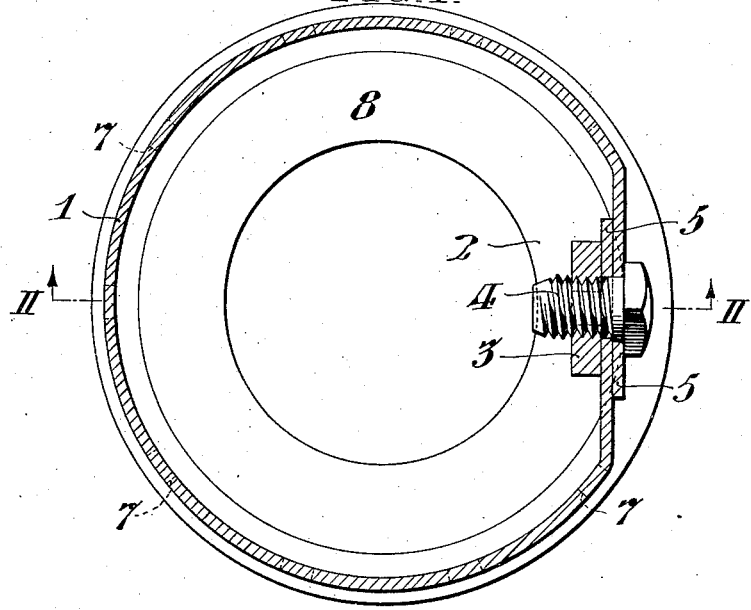
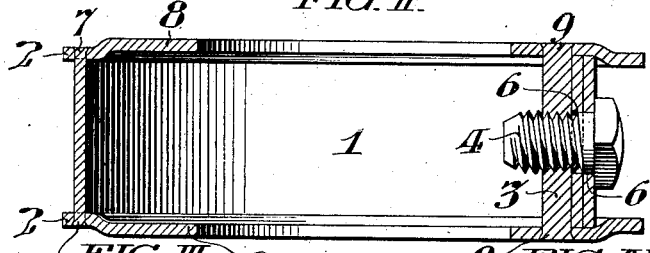
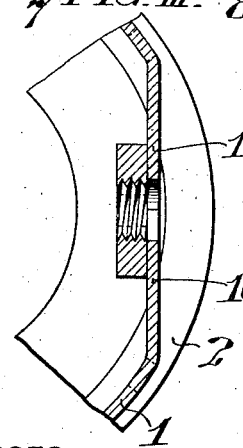 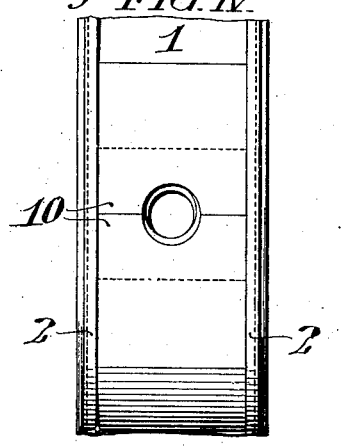
WITNESSES:
Clifton C. Hallowell
John C. Bergner
INVENTOR:
CHARLES E. BRINLEY,
by Paige, Paul & Foley
Attys No. 846,088. PATENTED MAR. 5, 1907.
C. E. BRINLEY.
SHAFT COLLAR.
APPLICATION FILED APR. 6, 1906.
2 SHEETS—SHEET 2.
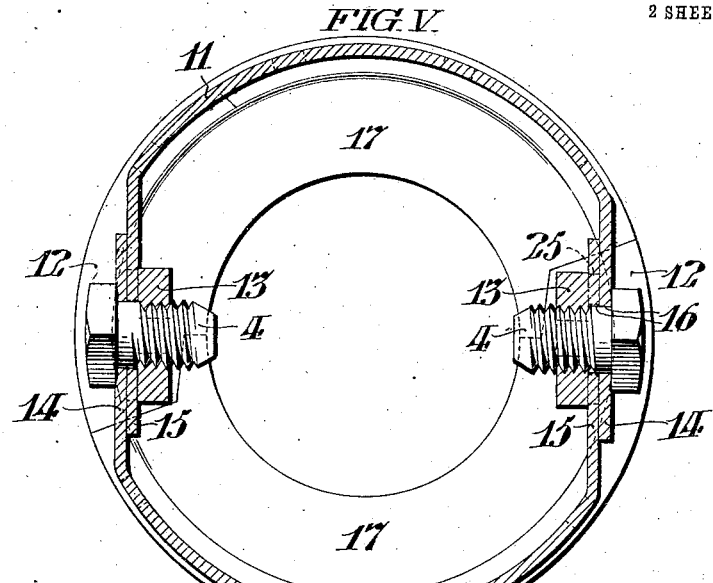
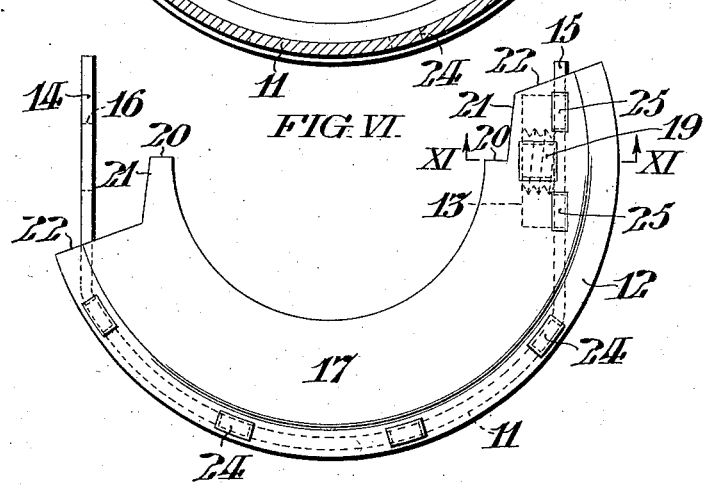
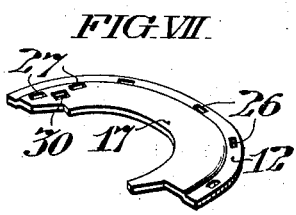
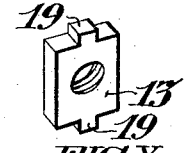
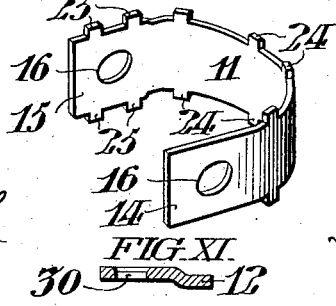
WITNESSES:
INVENTOR:
CHARLES E. BRINLEY,

UNITED STATES PATENT OFFICE.

CHARLES E. BRINLEY, OF PHILADELPHIA, PENNSYLVANIA, ASSIGNOR TO THE AMERICAN PULLEY COMPANY, OF PHILADELPHIA, PENNSYLVANIA, A CORPORATION OF PENNSYLVANIA.

SHAFT-COLLAR.

No. 846,088.  Specification of Letters Patent.  Patented March 5, 1907.

Application filed April 6, 1906. Serial No. 310,234.

*To all whom it may concern:*

Be it known that I, CHARLES E. BRINLEY, of Philadelphia, in the county of Philadelphia and State of Pennsylvania, have invented certain new and useful Improvements in Shaft-Collars, whereof the following is a specification, reference being had to the accompanying drawings.

According to my invention shaft-collars are constructed entirely of sheet metal.

I have shown and will describe a convenient form of my invention, in which the collar is built up of the union of a comparatively small number of pieces of rolled steel, die-cut or die-struck and combined by riveting, and I will describe this invention as applied both to an integral collar and to a split collar.

In the accompanying drawings, Figure I is a transverse central section through an integral collar constructed according to my invention. Fig. II is a cross-section along the line II II in Fig. I. Figs. III and IV are fragmentary detail views, respectively sectional and elevational, of a collar differing slightly from the one shown in Figs. I and II. Fig. V is a transverse central section through a split collar constructed according to my invention. Fig. VI is a plan view of one of the two segmental sections, hereinafter termed "segments," of which the split collar is formed. Figs. VII, VIII, IX, and X are detail perspective views of the four parts by the union of which one of the segments of the split collar is formed. Fig. XI is a cross-section of one of the cheek-plates, taken on the line XI XI in Fig. VI.

I will first describe my invention as applied to the integral collar shown in Figs. I and II. Said collar consists of a uniting-piece 1, two side plates 2 2, and a nut 3. The parts thus enumerated when properly united completely form the collar, which is arranged to be set upon a shaft by the set-screw 4. The uniting-piece 1 consists, as shown, of a single flat strip of sheet metal bent to form somewhat more than a complete circle, its overlapping ends 5 5 being flattened, as shown, and pierced with corresponding screw-holes 6 6. The sides of the collar are formed by two side plates 2 2, each of which is shown in the form of an annular disk having an interior diameter about equal to the diameter of the shaft upon which the collar is to be set. The side plates 2 are secured to the uniting-piece 1 by a series of spuds 7 7, formed upon the opposite edges of said piece 1. The side plates 2 are appropriately pierced with openings, preferably rectangular, for the reception of these spuds and are united to the piece 1 by riveting the ends of the spuds in said openings. Each of the side plates 2 has an outwardly-embossed area 8 in order that the outside surfaces of the collar may project slightly beyond and protect the projecting riveted ends of the spuds. In addition to the parts thus far described the nut 3, provided with spuds 9, is secured between the side plates 2 immediately adjacent to the flattened and overlapping ends of the piece 1. The spuds of this nut project through corresponding openings in the side plates and are riveted therein. It will be understood that in case the piece 1 has its flattened ends of sufficient thickness to permit the cutting of an internal thread for the screw 4 the nut may be omitted; but as it is one object of my invention to make all of the parts as light, and therefore as thin, as possible I prefer to use the separate nut 3, as shown.

In the slightly variant form of collar shown in Figs. III and IV the flattened ends 10 of the uniting-piece 1 abut against each other instead of overlapping. In other respects the construction is similar to the collar previously described.

I will now describe the adaptation of my invention to a split collar, as illustrated in Figs. V to XI, inclusive. The complete split collar consists of two counterpart segments, (best shown in Figs. V and VI,) each comprising a uniting-piece 11, opposed side plates 12, and the nut 13. Said segments are secured to each other and to the shafting upon which they are mounted by the set-screws 4. (Shown in Fig. V.) Each uniting-piece 11 consists of somewhat more than a semicircle, the overlapping ends 14 and 15 being flattened, as shown, and pierced with corresponding screw-holes 16. The flattening of the overlapping ends is of such extent and so arranged that the screw-holes occur at about the center of the flattened portions, which latter are in tangential relation to a circle concentric with the collar at the point coincident with the center of said holes. When the segments are joined to form a collar, the overlapping ends 14 and 15 of the pieces 11 are arranged in alternate relation to each other—that is to say, of each uniting-piece 11 one end 14 lies to the outside and the other end 15 to the inside of the collar—as best shown in Fig. V. The side plates 12 form the sides of the segments of the collar, each plate substantially comprising a semi-annulus, with its ends of such contour as to form a convenient interlock. I prefer that this interlocking contour shall comprise a partial radius 20, an approximate tangent 21, and a complementary radius 22. The tangent 21 may be slightly inclined, as shown, so that when joining the complementary segments together they slide upon these tangential edges until the overlapping ends of the opposed uniting-pieces 11 are brought closely together and the overlocking ends of the side plates 12 abut, whereby each pair forms a complete annular disk, two of which when united make up the collar; but it will be understood that the interlocking line between these annular segments may be varied to form any desired interlock. The side plates 12 are united by the piece 11, which, as best shown in Fig. X, is provided with a series of spuds 24, extending from its opposite edges throughout its circular extent, and spuds 25, extending from the opposite edges of the flattened portion 15, which, as best shown in Fig. X, is slightly increased in width to conform to the shape of the side plates 12. These plates 12 are appropriately pierced with openings 26 and 27, preferably rectangular and respectively arranged for the reception of said spuds, which are secured therein by riveting their ends, as shown in Fig. VI. Each of the plates 12 has an outwardly-embossed area 17 arranged to cause the outside surfaces of the collar to extend beyond the slightly-projecting ends of the riveted spuds 24. The nut 13 is arranged to be secured in adjacent relation to the flattened portion 15, with its threaded aperture in alinement with the screw-holes 16, and is conveniently provided with spuds 19, arranged to project through corresponding countersunk openings 30 (see Fig. XI) in the embossed area of the cheek-plates 12 and to be riveted therein. It may be noted that the spuds 25, which extend through the countersunk openings 37 in said embossed area 17, are afterward ground off flush with the embossed surfaces. The side plates 12 are united to their respective uniting-pieces 11 in the relation best shown in Fig. VI, so that at one end the side plates substantially overlie one flattened extremity 15 of the piece 11, while the other flattened extremity 14 is completely exposed to be received within the complementary segment. The radii 20 of the interlock are conveniently shown as coincident with the axes of the screws 4. It will be understood that each of the segments is thus formed of the four pieces shaped and united as described, forming an interchangeable member so arranged that when two of these members are interlocked and united by the insertion of the screws 4 4 an exceedingly strong and rigid collar is produced with the employment of a minimum amount of metal.

Although I have now described convenient forms of construction which I have employed in the construction of shaft-collars of sheet metal, I desire it to be understood that my invention is not limited to the specific forms thus illustrated, but includes generally the formation from sheet metal of a shaft-collar having a particular structural organization. This organization in its essentials comprises a plurality of side walls whose edges are adapted to conform to the periphery of the shaft and a means of uniting said walls and maintaining them in their proper relation to one another, together with means for detachably connecting the collar as a whole with the shaft. The typical structure thus has a channel, ordinarily U-shaped in cross-section, which opens toward the shaft. It is obvious, however, that the integral or non-integral character of the sheet-metal structure is not of the essence of the invention and that when non-integral the organization permits of a greater variety of types differing from one another in the details of their initial form and their method of union. Two of these non-integral types have been above described; but it will be noted that a single piece of sheet metal may be pressed so as to form two side walls and a uniting-strip, thus forming a collar having a channel open toward the shaft and presenting the edges of the metal for contact therewith. It is therefore obvious that the principle of my invention as I have disclosed it consists in the forming or building up of a shaft-collar from sheet-metal parts and that these parts may be of other shapes and may be differently arranged and may be otherwise assembled than in the specific forms which I have illustrated. In all forms of my invention there is this common element, that a plurality of side walls of sheet metal are rigidly united by an element or elements of sheet metal, so as to present the inner edges of the walls for contact with the shaft. In the embodiments of my invention in which the collar is built up from separate parts I employ for the side walls a plurality of annular disks, (either solid or built up from segmental plates,) the inner aperture of said annuli being conformed to the side of the shaft, and combine or connect them by means of one or more separate pieces in the form of uniting-strip.

It is most convenient to use a circular strip, (made of one or more pieces,) according as the collar is integral or split, and combine it with the annular disks in a peripheral relation. I have accordingly in some of the claims spoken of the channel of U-shaped cross-section formed by these pieces thus assembled. If, however, the uniting-strip were placed more or less centrally in relation to the disks, so as to form an H-shaped section, I should still continue to regard the strip as uniting the side walls within the meaning of the claims. If two strips were employed, one uniting the inner edges and the other uniting the outer edges of the annuli, the cross-section would be rectangular.

Having thus described my invention, I claim—

1. A shaft-collar comprising a plurality of annular disks of sheet metal, and an annular sheet-metal member riveted to the disks and uniting them, substantially as set forth.

2. A shaft-collar formed of pressed sheet metal, forming a channel U-shaped in cross-section, open toward the shaft and presenting both edges of the metal for contact therewith, substantially as set forth.

3. A shaft-collar formed of pressed sheet metal, comprising parallel annular disks having their inner edges presented for contact with the shaft; means rigidly connecting said disks, affording a channel adjacent to said shaft intermediate said edges; and means for securing said collar in position, substantially as set forth.

4. A shaft-collar formed of pressed sheet metal, comprising parallel annular disks having their inner edges presented for contact with the shaft; an annular sheet-metal member with overlapping ends connecting said disks in rigid relation; and a set-screw passing through said overlapping ends uniting them together and also setting the collar on the shaft, substantially as set forth.

5. A shaft-collar formed of pressed sheet metal, comprising parallel annular disks having their inner edges presented for contact with the shaft; and a peripheral wall connecting said disks in rigid relation, said peripheral wall being riveted to said disks, substantially as set forth.

6. A shaft-collar comprising a hollow ring having a peripheral wall and side walls formed of pressed sheet metal, said peripheral wall being provided with means for connecting said walls in rigid relation; and a set-screw in the peripheral wall whereby the collar is set on the shaft, substantially as set forth.

7. A sheet-metal shaft-collar comprising side plates in the form of annular disks, provided with openings; an annular sheet-metal member interposed between the side plates, formed by bending sheet metal into circular form with overlapping ends and provided with projecting spuds on its edges, said spuds being received and riveted in said openings in the side plates, substantially as set forth.

8. A sheet-metal shaft-collar comprising side plates in the form of annular disks provided with openings; a uniting member interposed between the side plates formed by bending sheet metal into circular form with flat overlapping ends and provided with projecting spuds on its edges, said spuds being received and riveted in said openings in the side plates; and a nut with spuds projecting from two sides, simultaneously riveted between the side plates immediately adjacent to the overlapping ends of the uniting member, substantially as set forth.

9. A shaft-collar comprising an annular sheet-metal member and two annular disks of the same, all united by riveting projecting portions of the strips into the disks, said annular disks having embossed portions on their outside surfaces for the protection of the rivet-heads, substantially as set forth.

10. A split shaft-collar of sheet metal composed of two similar segments each formed by the riveting together of two sheet-metal side plates and one uniting-piece, the side plates being provided at their extremities with corresponding interlocking edges of irregular contour and the uniting-pieces being provided with flattened extremities, substantially as set forth.

11. A split collar of sheet metal made up of two similar segments each of which comprises two side plates, with a uniting-piece riveted between them; the side plates being provided with corresponding interlocking edges where they abut against the other segment, including a radial and a tangential edge; the uniting-pieces each consisting of somewhat more than semicircles with overlapping flattened ends; and a nut in immediate juxtaposition to one of the flattened ends of said uniting-pieces, substantially as set forth.

12. A semi-annular section for a split collar composed of four integral rolled-steel pieces, to wit, a uniting-piece extending somewhat over a semicircle with flattened extremities and provided with spuds on its edges; two similar side plates each equal in extent to a semi-annulus, terminating at each end in similar interlocking edges and having openings; and a nut, with formation of projecting spuds thereon, said spuds on the edges of the uniting-piece and nut being received and riveted within corresponding openings in the side plates whereby all are united to form a complete split-collar section, with inclosure of one of the flattened extremities of the uniting-piece and exposure of the other, substantially as set forth.

13. A sheet-metal shaft-collar comprising side plates in the form of annular disks; an annular uniting member interposed within the side plates formed by bending sheet metal into circular form with overlapping ends, said overlapping ends having registering holes and provided with means for securing said side plates and uniting member in rigid relation.

14. A sheet-metal shaft-collar comprising side plates in the form of annular disks; an annular uniting member interposed between the side plates, formed by bending sheet metal into circular form with overlapping ends, said overlapping ends having registering holes; a nut placed coaxially with the registering holes in said uniting member, said side plates nuts and uniting member being secured in rigid relation substantially as set forth.

15. A sheet-metal shaft-collar comprising side plates in the form of annular disks; a uniting member interposed between the side plates formed by bending sheet metal into circular form, and provided with openings through the ends thereof; a nut registering with said openings, said side plates nut and uniting member being secured in rigid relation.

In testimony whereof I have hereunto signed my name, at Philadelphia, Pennsylvania, this 3d day of April, 1906.

CHARLES E. BRINLEY.

Witnesses:
ALBERT W. MORRIS,
RUSSELL H. BOWEN.